(12) United States Patent
Hatti et al.

(10) Patent No.: US 7,193,656 B2
(45) Date of Patent: Mar. 20, 2007

(54) LINE ADDRESS COMPUTER FOR PROVIDING COEFFICIENTS TO A CHROMA FILTER

(75) Inventors: Mallinath Hatti, Bangalore (IN); Lakshmanan Ramakrishnan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 518 days.

(21) Appl. No.: 10/712,638

(22) Filed: Nov. 13, 2003

(65) Prior Publication Data
US 2005/0036065 A1 Feb. 17, 2005

Related U.S. Application Data

(60) Provisional application No. 60/495,695, filed on Aug. 14, 2003.

(51) Int. Cl.
*H04N 11/22* (2006.01)

(52) U.S. Cl. .................... 348/455; 348/453; 348/491

(58) Field of Classification Search ................ 348/453, 348/449, 450, 557, 554–556, 558, 713, 455, 348/456, 488, 490, 491, 492, 494, 503; H04N 11/20, H04N 11/22
See application file for complete search history.

(56) References Cited

U.S. PATENT DOCUMENTS

| 5,650,824 A | * | 7/1997 | Huang | 348/453 |
| 5,790,197 A | * | 8/1998 | Canfield | 348/453 |
| 5,914,754 A | * | 6/1999 | Kori et al. | 348/455 |

\* cited by examiner

*Primary Examiner*—Michael H. Lee
(74) *Attorney, Agent, or Firm*—McAndrews, Held & Malloy Ltd.

(57) ABSTRACT

Presented herein is a line address computer for providing chroma coefficients to a chroma filter. At each horizontal synchronization pulse, the line address computer provides a set of interpolation weights to a chroma filter. The chroma filter uses the provided set of weights to interpolate pixels in chroma pixel positions in a display format from chroma pixels in another format.

10 Claims, 7 Drawing Sheets

Top Field

Bottom Field

FIGURE 2C

FIG. 3
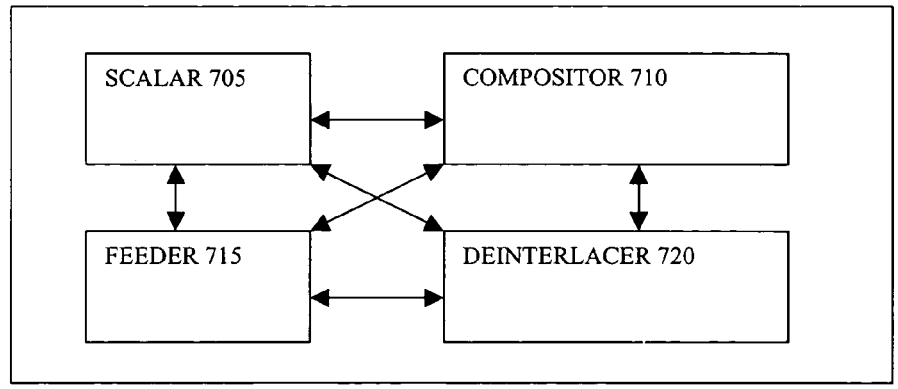
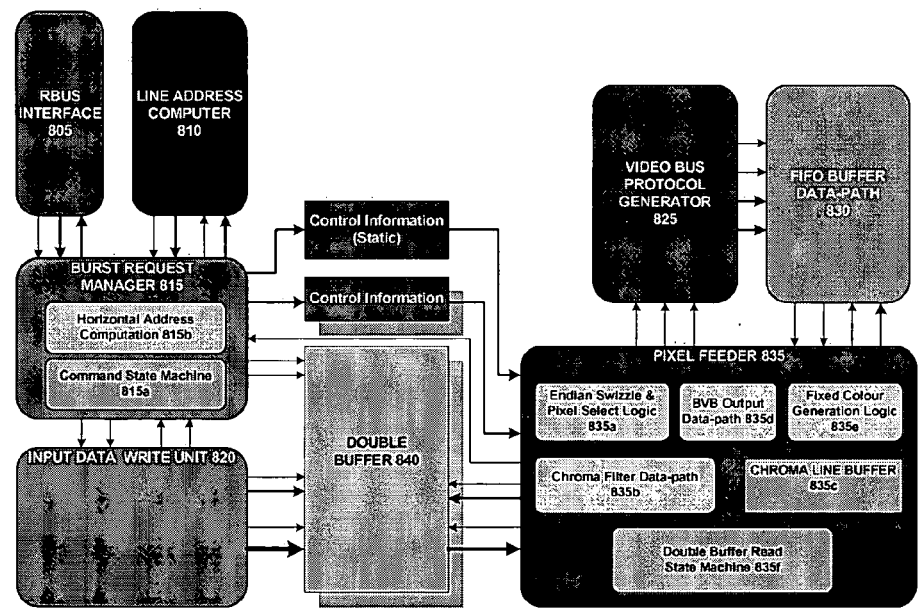
FIGURE 4

Top Field

| | | | | | | | |
|---|---|---|---|---|---|---|---|
| 100(0) | YR | Y | YR | Y | ... | YR | Y |
| 100(2) | YB | Y | YB | Y | ... | YB | Y |
| 100(4) | YR | Y | YR | Y | ... | YR | Y |
| 100(6) | YB | Y | YB | Y | ... | YB | Y |
| 100(8) | YR | Y | YR | Y | ... | YR | Y |
| 100(10) | YB | Y | YB | Y | ... | YB | Y |
| : | | | | | | | |
| 100(N-1) | YB | Y | YB | Y | ... | YB | Y |

Bottom Field

| | | | | | | | |
|---|---|---|---|---|---|---|---|
| 100(1) | YR | Y | YR | Y | ... | YR | Y |
| 100(3) | YB | Y | YB | Y | ... | YB | Y |
| 100(5) | YR | Y | YR | Y | ... | YR | Y |
| 100(7) | YB | Y | YB | Y | ... | YB | Y |
| 100(9) | YR | Y | YR | Y | ... | YR | Y |
| 100(11) | YB | Y | YB | Y | ... | YB | Y |
| : | | | | | | | |
| 100(N) | YB | Y | YB | Y | ... | YB | Y |

```
        Top Field                              Bottom Field

LINE ADDRESS COMPUTER FOR PROVIDING COEFFICIENTS TO A CHROMA FILTER

RELATED APPLICATIONS

This application claims priority to Provisional Application for U.S. patent, application Ser. No. 60/495,695, entitled "LINE ADDRESS COMPUTER FOR FACILITATING CHROMA CONVERSION", filed Aug. 14, 2003, by Hatti, which is incorporated herein by reference. This application is also related to U.S. patent application, Ser. No. 60/495,301, entitled "PIXEL REORDERING LOGIC FOR MULTIPLE FORMATS IN A FEEDER", filed Aug. 14, 2003, by Hatti, et. al., which is incorporated herein by reference. This application is also related to the following U.S. patent applications, each of which are incorporated herein by reference: "Line Address Computer for Decoding the Line Addresses of Decoded Video Data", U.S. patent application Ser. No. 10/703,332, filed Nov. 7, 2003 by Hatti, et. al., and claiming priority to Provisional Application for Patent Ser. No. 60/495,695. "Pixel Reordering and Selection Logic", U.S. patent application Ser. No. 10/712,482, filed Nov. 13, 2003 by Hatti, et. al., and claiming priority to Provisional Application for Patent Ser. No. 60/495,301. "Line Address Computer for Providing Line Addresses in Multiple Contexts", U.S. patent application Ser. No. 10/714,833, filed Nov. 14, 2003 by Hatti, and claiming priority to Provisional Application for Patent Ser. No. 60/495,695.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A video decoder receives encoded video data and decodes and/or decompresses the video data. The decoded video data comprises a series of pictures. A display device displays the pictures. The pictures comprise a two-dimensional grid of pixels. The display device displays the pixels of each picture in real time at a constant rate. In contrast, the rate of decoding can vary considerably for different video data. Accordingly, the video decoder writes the decoded pictures in a frame buffer.

Among other things, a display engine is synchronized with the display device and provides the appropriate pixels to the display device for display. The display engine determines the frame buffer address of the appropriate pixels, in order to provide the appropriate pixels to the display device. The address of the appropriate pixels is dependent on the manner that the video decoder writes the picture to the frame buffer.

Characteristics that characterize the manner that the video decoder writes the picture to the frame buffer include the packing of luma and chroma pixels, the linearity that the picture is stored and the spatial relationship between the luma and chroma pixels are factors. The foregoing characteristics are usually determined by the native format and the encoding format of the source video data.

The luma and chroma pixels of a picture can either be packed together or separately. The chroma pixels include red difference pixel Cr, and blue difference pixel Cb. In macroblock format, the luma pixels are packed in one array, while both chroma pixels Cr/Cb are packed together in another array. In planar format, the luma pixels are packed in one array, the Cr pixels are packed in a second array, and the Cb pixels are packed in a third array. In packed YUV, the luma pixels and both the chroma Cr/Cb pixels are packed together in a single array.

The video decoder does not necessarily store the frame in a linear manner. In planar & packed YUV formats, the video decoder stores pictures in left to right and top to bottom order in the memory. However, in MPEG 1, 2, and 4, and DV-25 formats, pictures are stored in the frame buffer in a macroblock format. In the macroblock format, the pixels of the frame are divided into two dimensional blocks. The video decoder stores the two dimensional blocks in consecutive memory locations.

Additionally, the spatial relationship of chroma pixels to luma pixels can differ among the many standards. Standards defining the spatial relationship of the chroma pixels to luma pixels include MPEG 4:2:0, MPEG 4:2:2, DV-25 4:1:1, and DV-25 4:2:0, to name a few. Where the standards for the display and the decoded video data differ, chroma pixels for the display can be interpolated from two or more chroma pixels in the decoded video data. The chroma interpolation depends on the native format of the source video data.

Conventionally, after each horizontal synchronization pulse, the host processor calculates the address of the first pixels of a line and the parameters for chroma format conversion. The host processor then programs the display engine with the foregoing.

Programming the display engine at each horizontal synchronization pulse consumes considerable bandwidth from the host processor.

Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

Presented herein is a line address computer for calculating the line addresses of decoded video data.

In one embodiment, there is presented a method for displaying pictures. The method includes decoding a picture wherein the decoded picture has a decode format, and interpolating chroma pixels for a display format with a set of weights, wherein the set of weights comprises a first set if the decode format comprises a first format, and a second set of weights, if the decode format comprises a second format.

In another embodiment, there is presented a decoder system for displaying pictures. The decoder system comprises a video decoder, a chroma filter, and a line address computer. The video decoder decodes a picture wherein the decoded picture has a decode format. The chroma filter interpolates chroma pixels for a display format. The line address computer provides a set of weights to the chroma filter, wherein the set of weights comprises a first set if the decode format comprises a first format, and a second set of weights to the display engine, if the decode format comprises a second format. The chroma filter interpolates the chroma pixels for the display format based on the provided set of weights.

In another embodiment, there is presented a circuit for interpolating chroma pixels. The circuit includes an input, a first chroma line buffer, a second chroma line buffer, a first multiplexer, and a second multiplexer. The input is configured to receive an input bitstream. The first chroma line buffer is connected to the input, and configured to store at least a portion of the input bitstream. The second chroma line buffer is connected to the input and configured to store at least a portion of the input bitstream. The first multiplexer has inputs, a first of the inputs connected to the first chroma line buffer, a second of the inputs connected to the second chroma line buffer, and a third of the inputs connected to the input configured to receive an input bitstream, the first multiplexer configured to select a particular one of the inputs as an output. The second multiplexer has inputs, a first of the inputs connected to the first chroma line buffer, a second of the inputs connected to the second chroma line buffer, and a third of the inputs connected to the input configured to receive an input bitstream, the second multiplexer configured to select a particular one of the inputs as an output.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIG. 2A is a block diagram of an exemplary progressive frame with MPEG 4:2:2 formatting;

FIG. 2B is a block diagram of an exemplary interlaced picture with MPEG 4:2:2 formatting;

FIG. 2C is a block diagram of a progressive picture with DV-25 4:2:0 formatting;

FIG. 3 is a block diagram of a display engine in accordance with an embodiment of the present invention;

FIG. 4 is a block diagram of a feeder in accordance with an embodiment of the present invention;

FIG. 7 is a block diagram of an interlaced picture with DV-25 4:2:0 formatting;

FIG. 8A is a block diagram of an exemplary progressive picture with MPEG 4:2:0 formatting;

FIG. 8B is a block diagram of an exemplary interlaced picture with MPEG 4:2:0 formatting;

FIG. 9A is a block diagram of an exemplary progressive picture with TM5 formatting; and FIG. 9B is a block diagram of an exemplary interlaced picture with TM5 formatting.

DETAILED DESCRIPTION OF THE INVENTION

Figure 1:
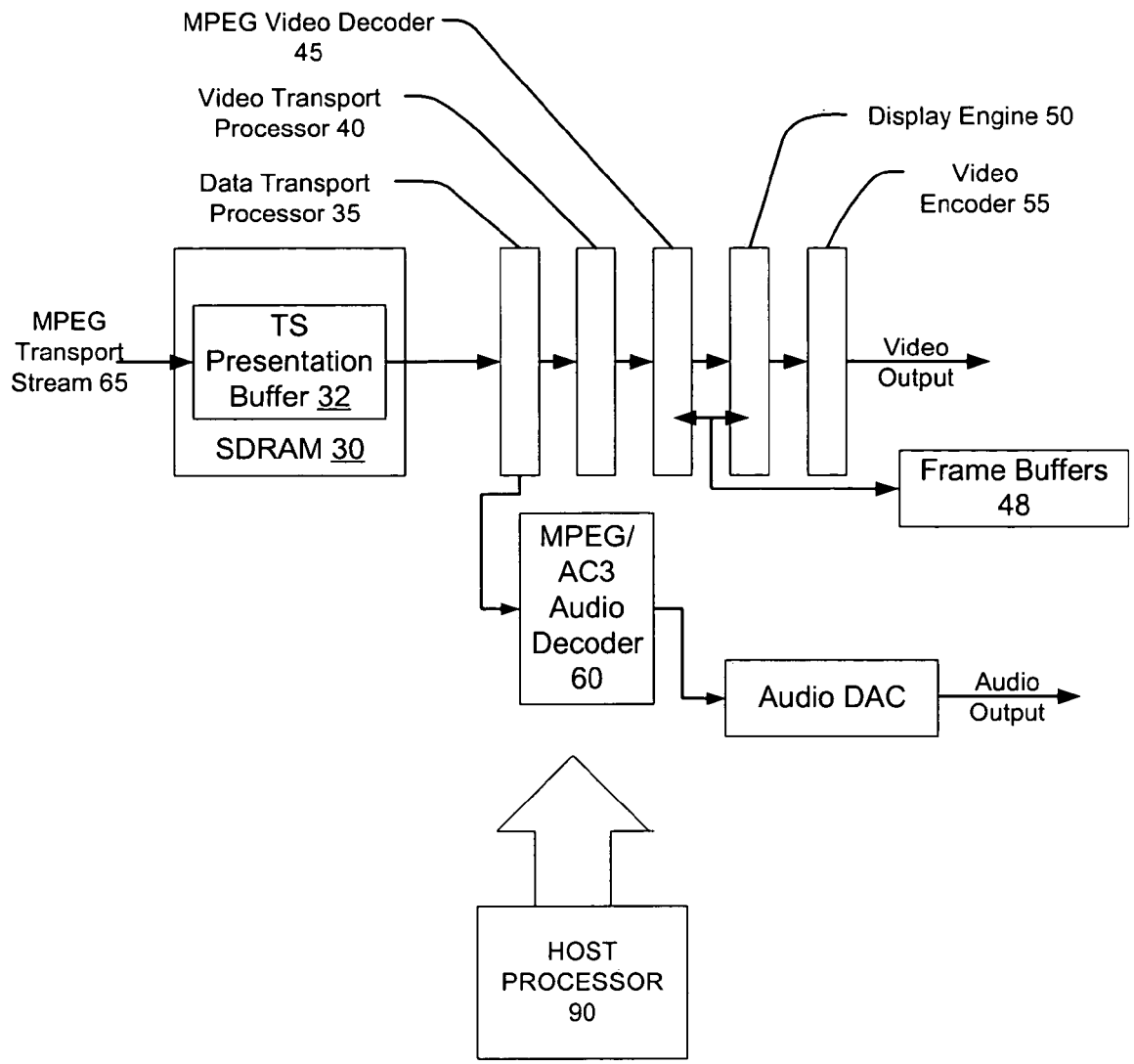
FIG. 1 is block diagram of an exemplary decoder system in accordance with an embodiment of the present invention.

Referring now to FIG. 1, there is illustrated a block diagram of an exemplary decoder system for decoding compressed video data, configured in accordance with an embodiment of the present invention. A processor, that may include a CPU 90, reads transport stream 65 into a transport stream buffer 32 within an SDRAM 30.

The data is output from the transport stream buffer 32 and is then passed to a data transport processor 35. The data transport processor 35 then demultiplexes the transport stream 65 into constituent transport streams. The constituent packetized elementary stream can include for example, video transport streams, and audio transport streams. The data transport processor 35 passes an audio transport stream to an audio decoder 60 and a video transport stream to a video transport processor 40.

The video transport processor 40 converts the video transport stream into a video elementary stream and provides the video elementary stream to a video decoder 45. The video decoder 45 decodes the video elementary stream, resulting in a sequence of decoded video pictures. The decoding can include decompressing the video elementary stream. It is noted that there are various standards for compressing the amount of data required for transportation and storage of video data, such as MPEG-2. The video decoder 45 decompresses the video data.

The decoded video data includes a series of frames. The frames are stored in a frame buffer 48. The frame buffer 48 can be dynamic random access memory (DRAM) comprising 128 bit/16 byte gigantic words (gwords). It is also noted that in certain standards, such as MPEG-2, the order that pictures are decoded is not necessarily the order that pictures are presented. Accordingly, several pictures can be stored in the frame buffer 48 at a given time.

The display engine 50 is responsible for providing a bitstream to a display device 65, such as a monitor or a television. The display device 65 displays the pictures in a specific predetermined display format with highly synchronized timing. The format dictates the order that different portions of a picture are displayed, as well as the positions of pixels.

Referring now to FIG. 2A, there is illustrated a block diagram of an exemplary picture 100 with a format known as the progressive MPEG 4:2:2. Each row 100(0) . . . 100(N) includes a row of luma pixels Y and a row of half as many chroma pixels C. Every other luma pixel is co-located with a chroma pixel C.

The pixels are displayed from left to right starting from row 100(0). In a progressive display, the rows 100(0) . . . 100(N) are displayed sequentially from 100(0) . . . 100(N).

Referring now to FIG. 2B, there is illustrated a block diagram of an exemplary picture with a format known as interlaced MPEG 4:2:2. The picture comprises a top field and a bottom field. The top field comprises the even-numbered rows 100(0), 100(2), . . . 100(N−1), while the bottom field comprises the odd-numbered rows 100(1), 100(3), . . . 100(N). The top field is displayed from left to right starting from row 100(0) and proceeding to row 100(N−1). The bottom field is displayed from left to right, starting from row 100(1), and proceeding to row 100(N).

The display device 65 is usually separate from the decoder system. The display device 65 displays the pictures with highly synchronized timing. Each row 100(0) . . . 100(N) is displayed at a particular time interval. The display engine 50 provides the pixels to the display device 65 for display, via the video encoder. The display device 65 and the display engine 50 are synchronized by means of a vertical synchronization pulses and horizontal synchronization pulses. When the display device 65 begins displaying a new frame 100 or field, the display device 65 transmits a vertical synchronization pulse. Each time the display device 65 begins displaying a new line 100(x), the display device 65 sends a horizontal synchronization pulse. The display engine 50 uses the horizontal and vertical synchronization pulses to provide a stream comprising the pixels at a time related to the time for display.

The display engine 50 generates the bitstream from the decoded pictures stored in the frame buffers 48. To generate the bitstream of the pixels for display on the display device 65, the display engine 50 fetches the pixels from the frame buffer 48. However, the format of the decoded pictures may be different from the display format. For example, the format of the decoded pictures may be progressive while the display device 65 is interlaced. Additionally, the decoded picture may have chroma pixels in different positions from the display format. Additionally, the pixels of the decoded picture are not necessarily stored in display order. In other words, the pixels that are displayed are not necessarily stored in adjacent memory locations.

Where the decoded picture has a different chroma format from the display format, the chroma pixels for the chroma pixel positions in the display format are interpolated from the chroma format of the decoded picture.

For illustrative purposes, the interpolation of chroma pixels from the decoded picture format to the display format will now be described, wherein the decoded picture format is known as the progressive DV25 4:2:2 format, and wherein the display format is the progressive MPEG 4:2:2 format. However, it is noted that in other embodiments of the present invention, the decoded picture format and the display format can be different and are not limited to the foregoing formats.

Referring now to FIG. 2C, there is illustrated a block diagram describing a picture 100 the progressive DV25 4:2:0 format. The frame comprises any number of lines 100(0) ... 100(n) of luma pixels Y. Every other luminance pixel Y in the horizontal direction is co-located with a chroma pixel, either Cr or Cb. In the first and second lines of the picture 100(0), 100(1), each luminance pixel Y in the vertical direction is co-located with a Cr pixel (indicated by R). In the third and fourth lines of the picture 100(2), 100(3), each luminance pixel Y in the vertical direction is co-located with a Cb pixel (indicated by B). The foregoing pattern is repeated for each line in the picture. Accordingly, in lines 100(4i), 100(4i+1) (where i is an integer), each luminance pixel in the vertical direction is co-located with a Cr pixel. In lines 100(4i+2), 100(4i+3) (where i is an integer), each luma pixel in the vertical direction is co-located with a Cb pixel.

An MPEG 4:2:2 formatted picture is generated by interpolating pixels in the chroma pixel positions for the MPEG 4:2:2 formatted picture from the chroma pixels in the DV25 4:2:0 picture. In an MPEG 4:2:2 formatted picture, each alternating horizontal luma Y pixel is co-located with chroma pixels Cr and Cb. However, in the DV25 4:2:0 format, each luma Y pixel is co-located with either a Cr or Cb pixel.

For example, in rows 100(2) and 100(3), each luma pixel Y is co-located with a chroma Cb pixel. The chroma Cr pixels in row 100(1) are one pixel above the chroma Cb pixel positions in row 100(2) and two pixels above the chroma Cb pixel positions in row 100(3). The chroma Cr pixels in row 100(4) are two pixels below the chroma red pixel positions in row 100(1) and one pixel below the chroma Cb pixel positions in row 100(3). In this case, the chroma Cr pixels in row 100(1) will be referred to as the top pixels, while the chroma Cr pixels in row 100(4) will be referred to as the bottom pixels.

The chroma pixels for the pixel positions in row 100(2) of the 4:2:2 format can be interpolated from the pixels in rows 100(1), 100(4) by applying weights to the pixel values. The weights for pixel are:

$WCr_T = 1-(\text{distance } Cr_1)/(\text{distance } Cr_1+\text{distance } Cr_4) = 0.667$ $WCr_B = 1-(\text{distance } Cr_4)/(\text{distance } Cr_1+\text{distance } Cr_4) = 0.333$ Accordingly, the chroma Cr pixels in row 100(2) of an 4:2:2 formatted frame are interpolated from the chroma Cr pixels in the DV-25 4:2:0 format by the following formula:

$Cr_2 = 0.667 Cr_1 + 0.333 Cr_4$

The chroma Cr pixels for the pixel positions in row 100(3) of the 4:2:2 format can be interpolated from the pixels in rows 100(1), 100(4) by applying weights to the pixel values. The weights for pixel are:

$WCr_T = 1-(\text{distance } Cr_1)/(\text{distance } Cr_1+\text{distance } Cr_4) = 0.333$ $WCr_B = 1-(\text{distance } Cr_4)/(\text{distance } Cr_1+\text{distance } Cr_4) = 0.667$ Accordingly, the chroma Cr pixels in row 100(3) of an 4:2:2 formatted frame are interpolated from the chroma Cr pixels in the DV-25 4:2:0 format by the following formula:

$Cr_3 = 0.333 Cr_1 + 0.667 Cr_4$

In rows 100(4) and 100(5), each luma pixel Y is co-located with a chroma Cr pixel. The chroma Cb pixels in row 100(3) are one pixel above the chroma Cr pixel positions in row 100(4) and two pixels above the chroma Cr pixel positions in row 100(5). The chroma Cb pixels in row 100(6) are two pixels below the chroma Cr pixel positions in row 100(4) and one pixel below the chroma Cr pixel positions in row 100(5). In this case, the chroma Cb pixels in row 100(3) are referred to as the top pixels, while the chroma Cb pixels in row 100(6) are referred to as the bottom pixels.

The chroma Cb pixels for the pixel positions in row 100(4) of the 4:2:2 format can be interpolated from the pixels in rows 100(3), 100(6) by applying weights to the pixel values. The weights for pixel are:

$WCb_T = 1-(\text{distance } Cb_3)/(\text{distance } Cb_3+\text{distance } Cb_6) = 0.667$ $WCb_B = 1-(\text{distance } Cb_6)/(\text{distance } Cb_3+\text{distance } Cb_6) = 0.333$ Accordingly, the chroma Cb pixels in row 100(4) of an 4:2:2 formatted frame are interpolated from the chroma Cb pixels in the DV-25 4:2:0 format by the following formula:

$Cb_4 = 0.667 Cb_3 + 0.333 Cb_6$

The chroma Cb pixels for the pixel positions in row 100(5) of the 4:2:2 format can be interpolated from the pixels in rows 100(3), 100(6) by applying weights to the pixel values. The weights for pixel are:

$WCb_T = 1-(\text{distance } Cb_3)/(\text{distance } Cb_3+\text{distance } Cb_6) = 0.333$ $WCb_B = 1-(\text{distance } Cb_6)/(\text{distance } Cb_3+\text{distance } Cb_6) = 0.667$ Accordingly, the chroma Cb pixels in row 100(5) of an 4:2:2 formatted frame are interpolated from the chroma Cb pixels in the DV-25 4:2:0 format by the following formula:

$Cb_5 = 0.333 Cb_3 + 0.667 Cb_6$

From the calculations, it can be seen that the rows containing top pixels, the rows bottom pixels, and the weights for the chroma pixel positions in rows 100(0) ... 100(N) are as follows:

| Row | Top Pixels | $WCr_T$/ $WCb_T$ | Row w/Bottom Pixels | $WCr_T$/ $WCb_T$ |
|---|---|---|---|---|
| 100(4i) | Cb pixels in row 100(4i − 1) | $WCb_T$ = 0.667 | Cb pixels in row 100(4i + 2) | $WCb_B$ = 0.333 |
| 100(4i + 1) | Cb pixels in row 100(4i − 1) | $WCb_T$ = 0.333 | Cb pixels in row 100(4i + 2) | $WCb_B$ = 0.667 |
| 100(4i + 2) | Cr pixels in 100(4i + 1) | $WCb_T$ = 0.667 | Cr pixels in 100(4i + 4) | $WCb_B$ = 0.333 |
| 100(4i + 3) | Cr pixels in 100(4i + 1) | $WCb_T$ = 0.333 | Cr pixels in 100(4i + 4) | $WCb_B$ = 0.667 |

From the above table, it can be seen that the top pixels, e.g., the Cr pixels in 100(4i+1) are displayed immediately prior to use for interpolating with subsequent lines 100(4i+2), 100(4i+3). The bottom pixels, e.g., the Cr pixels in row 100(4i+2) are displayed immediately after use for interpolating preceding lines 100(4i), 100(4i+1).

Referring now to FIG. 3, there is illustrated a block diagram of the display engine 50 in accordance with an embodiment of the present invention. The display engine 50 includes a scalar 705, a compositor 710, a feeder 715, and a deinterlacing filter 720. The feeder 715 provides a bitstream of the pixels in the order the pixels are displayed for the display device 65. The bitstream comprises chroma pixels in the chroma pixel positions of the display format.

Referring now to FIG. 4, there is illustrated a block diagram describing an exemplary feeder 715 in accordance with an embodiment of the present invention. The feeder 715 provides a bitstream comprising pixels for display on the display device 65. The feeder provides the pixels to the display device 65 at a time related to the time the pixels are to be displayed by the display device 65. Additionally, the bitstream comprises chroma pixels in the chroma pixel positions in accordance with the display format. At each horizontal synchronization pulse, a row 100(x) is presented to the display device 65 for display.

At each vertical synchronization pulse, the host processor 90 programs the feeder 715 with the addresses of the frame buffer memory locations storing the first luma pixels and the first chroma pixel(s) for display (i.e., the left most pixels in row 100(0)), and the format of the decoded picture.

The foregoing parameters are provided to the feeder 715 via the RBUS interface 805. After providing the parameters to the RBUS interface 805, the host 90 sets a start parameter in the RBUS interface 805.

The RBUS interface 805 provides the initial starting luma and chroma addresses to the BRM 815. When the BRM 815 receives the starting luma and chroma addresses, the start parameter in the RBUS interface 805 is deasserted. The BRM 815 issues the commands for fetching the luma and chroma pixels in the first line of the frame/field. The IDWU 820 effectuates the commands.

The BRM 815 includes a command state machine 815a and horizontal address computation logic 815b. The command state machine 815a can issue commands to the IDWU 820 causing the feeder 715 to fetch pixels from the frame buffer at a memory address provided by the command state machine 815a. The command state machine initially commands the IDWU 820 to fetch the pixels starting at the starting luma and chroma addresses. The horizontal computation logic 815b maintains the address of the frame buffer 48 location storing the next pixels in the display order.

The IDWU 820 writes the fetched pixels to a double buffer 840 until the double buffer 840 is full. After the double buffer 840 is full, the double buffer state machine detects when half of the data in the double buffer 840 is consumed. Responsive thereto, the command state machine 815a commands the IDWU 820 to fetch the next pixels in the display order, starting at the address calculated by the horizontal address computation logic 815b, until the double buffer 840 is full. The foregoing continues for each pixel in the first line 100(0).

A line address computer 810 calculates the address of the memory locations storing the starting pixels of the next line, e.g., line 100(1) if a progressive display or line 100(2) if an interlaced display. The BRM 815 causes the IDWU 820 to start fetching pixels from the provided starting address. For each horizontal synchronization pulse, the line address computer 810 provides the address of the memory locations storing the first pixel (leftmost) of a row of luma pixels. The line address computer 810 provides the address storing the first pixel of consecutive rows of luma pixels 100(0), 100(1), . . . , 100(N) if the display is progressive. The line address computer 810 provides the address storing the first pixel of alternating rows of luma pixels 100(0), 100(2), . . . , 100(N−1), 100(1), 100(3) . . . 100(N) if the display device 65 is interlaced.

Additionally, as noted above, the feeder 715 interpolates chroma pixels for the chroma pixel positions in the display frame from the pixels in the decoded frame. For the display format 4:2:2, as can be seen in FIGS. 2A and 2B, the chroma pixels are co-located with luma pixels. When the feeder 715 fetches a row of luma pixels, 100(x), the feeder 715 also interpolates the chroma pixels in the chroma pixel positions in row 100(x), from the chroma pixels in the decoded frame format. As can be seen from FIG. 2C, the pixels are interpolated from a row of top pixels and a row of bottom pixels. Accordingly, the line address computer 810 calculates the address of the starting chroma pixels in the chroma pixel rows needed for interpolating.

The line address computer 810 is described in more detail in LINE ADDRESS COMPUTER FOR CALCULATING THE LINE ADDRESSES OF DECODED VIDEO DATA, U.S. patent application Ser. No. 10/703,332 filed Nov. 7, 2003, and incorporated herein by reference.

Additionally, at each horizontal synchronization pulse, the line address computer 810 provides the interpolation weights, $WCb_T$, $WCb_B$, $WCr_T$, and $WCr_B$ for interpolation to a chroma filter. The interpolation weights depend on the decoded frame format, the display format, and the specific row with the chroma pixel positions.

A pixel feeder 835 comprises an endian swizzle & pixel select logic 835a, a chroma filter data path 835b, a chroma line buffer 835c, an output data path 835d, fixed color generation logic 835e, and a double buffer read state machine 835f. The double buffer state machine 835f performs various duties that manage the pixel feeder 835. The duties include maintaining the double-buffer 840 status, reading pixels from the double buffer 840, sequencing the chroma filter datapath 835b, and loading pixels onto the FIFO 830.

The pixels are fetched from the frame buffer and stored in the double buffer 840 in their native byte-packing format. The double buffer state machine 835f creates a rasterized data stream from the luma pixel data as well as associated chroma pixel bitstream(s). The luma pixel data stream and the chroma pixel bitstream(s) are synchronized with respect to each other, such that the luma pixels in the stream at a particular time and the chroma pixels in the stream(s) at a particular time are either co-located, or the bottom pixels for the chroma pixel positions co-located with the luma pixels.

In the case where the decoded frame is in the packed YUV format, a single data stream includes both the luma and chroma pixels. The endian swizzle & pixel select logic converts the byte-packing format to the byte-packing format of the display format and separates the chroma pixels from the bitstream, thereby creating a chroma bitstream.

The endian swizzle & pixel select logic are described in more detail in PIXEL REORDERING AND SELECTION LOGIC, U.S. patent application, Ser. No. 10/712,482 filed Nov. 13, 2003.

The chroma filter 835b receives the chroma portion of the bitstream and converts the chroma format to the chroma format of the display format. As noted above, the chroma pixels in a row for the display format can be interpolated from more than one row. To reduce the number of row fetches to either one chroma row or one chroma Cr row and one chroma Cb row per horizontal synchronization pulse, the chroma line buffer 835c can store a chroma row, or one chroma Cr row and one chroma Cb row.

As noted earlier, in the case where the decoded frame format is DV-25 4:2:0, and the display format is 4:2:2, the top pixels for interpolating chroma pixels are displayed immediately prior to use as top pixels for interpolation. Bottom pixels are displayed immediately after use as bottom pixels for interpolation. Accordingly, when top pixels are displayed, the top pixels can be buffered in the chroma line buffer 835c for use interpolating the chroma pixels for the subsequent row after the next horizontal synchronization pulse. Similarly, when the bottom pixels are used for interpolating, the bottom pixels can be stored in the chroma line buffer 835c for displaying after the next horizontal synchronization pulse.

Figure 5:
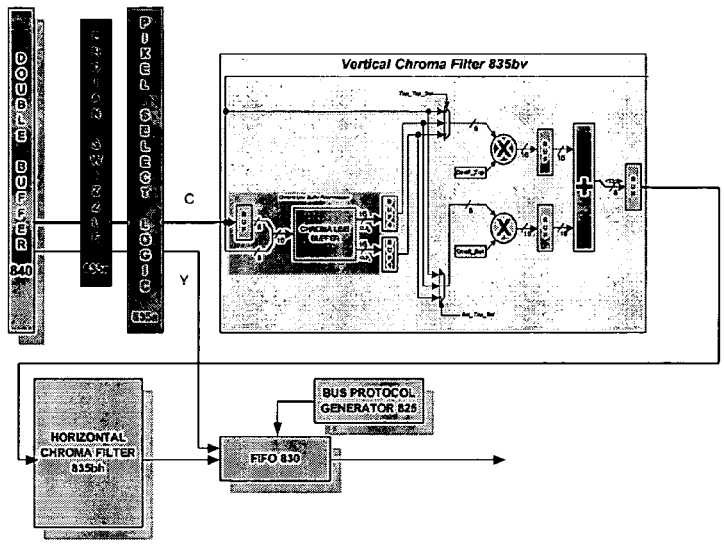
FIG. 5 is a block diagram of a pixel feeder in accordance with an embodiment of the present invention.

Referring now to FIG. 5, there is illustrated a block diagram of the pixel feeder 835 in accordance with an embodiment of the present invention. The pixel feeder 835 receives a rasterized data stream from the double buffer 840. The endian swizzle & pixel select logic 835a converts the byte-packing format of the decoded frame to the byte-packing format of the display format. The rasterized data stream includes a chroma stream and a luma stream.

The luma pixel data stream and the chroma pixel bitstream(s) are synchronized with respect to each other, such that the luma pixels in the stream at a particular time and the chroma pixels in the stream(s) at a particular time are either co-located, or the bottom pixels for the chroma pixel positions co-located with the luma pixels.

A vertical chroma filter 835bv converts the chroma format in the vertical direction to the chroma format of the output format. A horizontal chroma filter 835bh receives the output of the vertical chroma filter and converts the format in the horizontal direction, if needed, to the chroma format of the output format.

The FIFO 830 receives the luma bitstream and a bitstream of interpolated chroma pixels. The FIFO 830 also receives signals from the bus protocol generator 825 to prepare the luma bitstream and interpolated chroma bitstream for transmission over a bus to the display 65.

Figure 6:
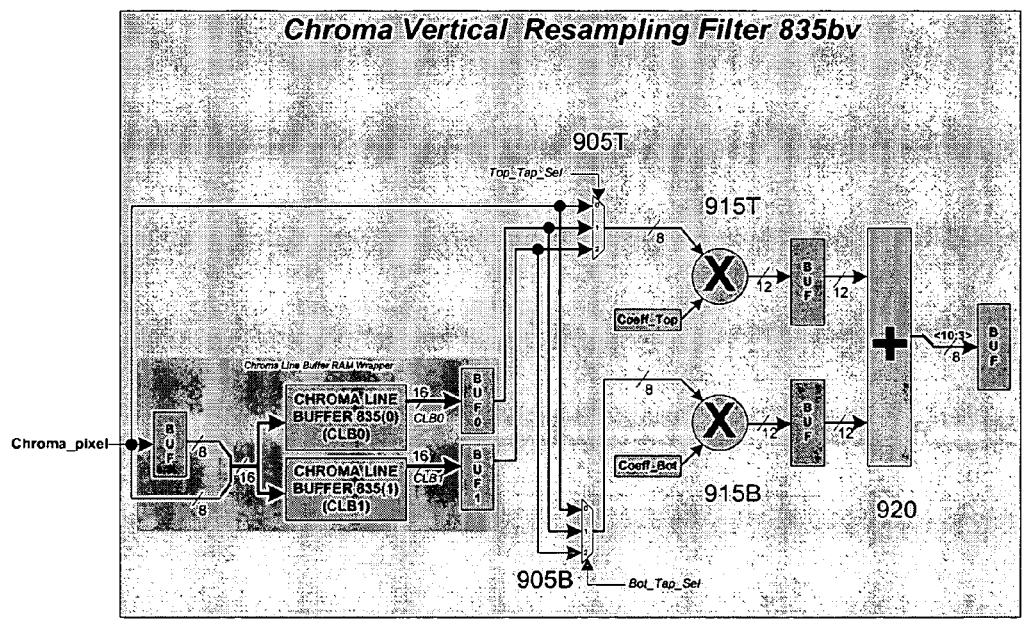
FIG. 6 is a block diagram of a vertical chroma filter in accordance with an embodiment of the present invention.

Referring now to FIG. 6, there is illustrated a block diagram of the vertical chroma filter 835bv. The vertical chroma filter 835bv receives a bitstream of chroma pixels C and interpolates chroma pixels for the output format in the vertical direction.

The chroma pixels C are fetched either one or two rows at a time. Where the chroma pixels are read two lines at a time, one line includes chroma Cr pixels and the other line includes chroma Cb pixels. The luma pixel data stream and the chroma pixel bitstream(s) are synchronized with respect to each other, such that the luma pixels in the stream at a particular time and the chroma pixels in the stream(s) at a particular time are either co-located, or the bottom pixels for the chroma pixel positions co-located with the luma pixels.

As noted earlier, in the case where the decoded frame format is DV-25 4:2:0, and the display format is 4:2:2, the top pixels for interpolating chroma pixels are displayed immediately prior to use as top pixels for interpolation. Bottom pixels are displayed immediately after use as bottom pixels for interpolation. Accordingly, when top pixels are displayed, the top pixels can be buffered in the chroma line buffer 835(0) for use interpolating the chroma pixels for the subsequent row. Similarly, when the bottom pixels are used for interpolating, the bottom pixels can be stored in the chroma line buffer 835(1) for displaying after the next horizontal synchronization pulse.

In the case where the display format is 4:2:2, the vertical chroma filter 835bv is bypassed without doing any vertical chroma interpolation.

The vertical chroma filter 835bv includes multiplexers 905T, 905B. Each multiplexer 905 selects between the chroma bitstream, the chroma pixels in chroma line buffer 835(0), and the chroma pixels in chroma line buffer 835(1). The selection of the multiplexer 905T provides the top pixels, while the selection of the multiplexer 905B provides the bottom pixels. Where a chroma pixel in the decoded frame format is co-located with a chroma pixel location in the display format (such as chroma Cr pixels in line 100(0)), the chroma pixel value is used. However, the chroma pixel is considered the bottom pixel, and a weight: $WCr_B/Cb_B=1$, while $WCr_T/Cb_T=0$.

The multiplexer 905T provides the top pixels to a top multiplexer 915T. The top multiplexer 915T also receives a top weight, $WCr_T/Cb_T$ from the line address computer 810. The multiplexer 905B provides the bottom pixels to a bottom multiplexer 915B. The bottom multiplexer 915B also receives a bottom weight, $WCr_B/Cb_B$ from the line address computer 810. The multipliers 915 multiply the chroma pixels with the provided weight, and provide the product to an adder 920. The adder 920 sums the products of the multipliers 915T, 915B. The output of the adder 920 is the interpolated chroma pixel for the output format.

The table below indicates the chroma line received from the line address computer 810, the selections of the multiplexers 905T, 905B, the weights provided by the line address computer 810 to the multipliers 915T, 915B, and buffer writes to chroma line buffers 835(0), and 835(1).

| Luma Line in Bitstream | Chroma Row in Bitstream | Selections of MUX Weights and Buffer Writes |
|---|---|---|
| 100(4i) | Cb in row 100(4i + 2) | 915T/Cr -> X<br>$WCr_T = 0$<br>915B/Cr -> CLB0<br>$WCr_B = 1.00$<br>915T/Cb -> CLB1<br>$WCb_T = 0.67$<br>915B/Cb -> C Bitstream<br>$WCb_B = 0.33$<br>Write Bitstream (Cb in row 100(4i + 2)) to CLB0 |
| 100(4i + 1) | Cr in row 100(4i + 1) | 915T/Cr -> X<br>$WCr_T = 0$<br>915B/Cr -> C Bitstream<br>$WCr_B = 1.00$<br>915T/Cb -> CLB1<br>$WCb_T = 0.33$ |

-continued

| Luma Line in Bitstream | Chroma Row in Bitstream | Selections of MUX Weights and Buffer Writes |
|---|---|---|
| 100(4i + 2) | Cr in row 100(4i + 4) | 915B/Cb -> CLB0<br>$WCb_B = 0.67$<br>Write Bitstream (Cb in row 100(4i + 1)) to CLB1<br>915T/Cr -> X<br>$WCb_T = 0$<br>915B/Cr -> CLB0<br>$WCb_B = 1.00$<br>915T/Cb -> CLB1<br>$WCr_T = 0.67$<br>915B/Cb -> C Bitstream<br>$WCr_B = 0.33$<br>Write Bitstream (Cb in row 100(4i + 4)) to CLB0 |
| 100(4i + 3) | Cb in row 100(4i + 3) | 915T/Cr -> X<br>$WCb_T = 0$<br>915B/Cr -> C Bitstream<br>$WCb_B = 1.00$<br>915T/Cb -> CLB1<br>$WCr_T = 0.33$<br>915B/Cb -> CLB0<br>$WCr_B = 0.67$<br>Write Bitstream (Cb in row 100(4i + 3)) to CLB1 |

The chroma format conversion of other exemplary decoded frame formats to the 4:2:2 display format will now be described.

Interlaced DV-25 TO Interlaced MPEG 4:2:2

Referring now to FIG. 7, there is illustrated a block diagram describing a frame 100 with interlaced DV25 4:2:0 formatting. The frame comprises a top field and a bottom field. The top field comprises the even numbered rows 100(0), 100(2), ... 100(N-1), while the bottom field comprises the odd numbered rows 100(1), 100(3) ... 100(N). Each row 100(0) ... 100(N) comprises a row of luma pixels Y.

In the top field, each alternating row, 100(0), 100(4), 100(8), ... 100(N-3), and in the bottom field, each alternating row, 100(1), 100(5), ... 100(N-2), comprises a row of half as many chroma pixels Cr as luma pixels Y, wherein a chroma Cr pixel is co-located with every other luma pixel Y (a chroma Cr pixel co-located with a luma pixel is indicated with an R).

In the top field, each alternating row, 100(2), 100(6), 100(10), ... 100(N-1), and in the bottom field, each alternating row, 100(3), 100(7), ... 100(N), comprises a row of half as many chroma pixels Cb as luma pixels Y, wherein a chroma Cb pixel is co-located with every other luma pixel Y (a chroma Cb pixel co-located with a luma pixel is indicated with a B). The top field is displayed followed by the bottom field.

An 4:2:2 formatted top field is generated by interpolating pixels in the chroma pixel positions for the 4:2:2 formatted top field from the chroma pixels in the DV25 4:2:0 formatted top field. Similarly, an 4:2:2 formatted bottom field is generated by interpolating pixels in the chroma pixel positions for the 4:2:2 formatted bottom field from the chroma pixels in the DV25 4:2:0 formatted bottom field.

In an 4:2:2 formatted top field and bottom field, each alternating luma pixel Y is co-located with chroma pixels Cr and Cb. However, in DV25 4:2:0 interlaced top and bottom fields, each alternating luma Y pixel is co-located with either a Cr or Cb pixel.

For example, in the top field, row 100(2), and the bottom field, row 100(4), each luma pixel is co-located with a chroma Cb pixel. In the top field, the chroma Cr pixels in row 100(0) are located two pixels above the chroma Cb pixel positions in row 100(2), and the chroma Cr pixels in row 100(4) are located two pixels below the chroma Cb pixel positions in row 100(2). In the bottom field, the chroma Cr pixels in row 100(1) are located two pixels above the chroma Cr pixel positions in row 100(4), and the chroma Cr pixels in row 100(5) are located two pixels below the chroma Cb pixel positions in row 100(3).

The chroma red pixels for the chroma Cr pixel positions in row 100(2) can be interpolated from the chroma Cr pixels in rows 100(0) and 100(4) by applying weights to the pixel values. The weights for each pixel are:

$$WCr_T = 1 - (\text{distance } Cr_0)/(\text{distance } Cr_0 + \text{distance } Cr_4) = 0.5$$

$$WCr_B = 1 - (\text{distance } Cr_4)/(\text{distance } Cr_0 + \text{distance } Cr_4) = 0.5$$

Accordingly, the chroma Cr pixels in row 100(2) of an 4:2:2 formatted frame are interpolated from the chroma Cr pixels in the DV-25 4:2:0 formatted top field by the following formula:

$$Cr_2 = 0.5 Cr_0 + 0.5 Cr_4$$

The chroma Cr pixels for the pixel positions in row 100(3) of the 4:2:2 format can be interpolated from the pixels in rows 100(1), 100(5) by applying weights to the pixel values. The weights for pixel are:

$$WCr_T = 1 - (\text{distance } Cr_1)/(\text{distance } Cr_1 + \text{distance } Cr_5) = 0.5$$

$$WCr_B = 1 - (\text{distance } Cr_5)/(\text{distance } Cr_1 + \text{distance } Cr_5) = 0.5$$

Accordingly, the chroma Cr pixels in row 100(3) of an 4:2:2 formatted frame are interpolated from the chroma Cr pixels in the DV-25 4:2:0 formatted bottom field by the following formula:

$$Cr_3 = 0.5 Cr_1 + 0.5 Cr_5$$

In the top field, row 100(4), and the bottom field, row 100(5), each luma pixel is co-located with a chroma Cr pixel. In the top field, the chroma Cb pixels in row 100(2) are located two pixels above the chroma Cr pixel positions in row 100(4), and the chroma Cb pixels in row 100(6) are located two pixels below the chroma Cr pixel positions in row 100(4). In the bottom field, the chroma Cb pixels in row 100(3) are located two pixels above the chroma Cr pixel positions in row 100(5), and the chroma Cb pixels in row 100(7) are located two pixels below the chroma Cr pixel positions in row 100(5).

The chroma Cb pixels for the chroma pixel positions in row 100(4) can be interpolated from the chroma Cb pixels in rows 100(2) and 100(6) by applying weights to the pixel values. The weights for each pixel are:

$$WCb_T = 1 - (\text{distance } Cb_2)/(\text{distance } Cb_2 + \text{distance } Cb_6) = 0.5$$

$$WCb_B = 1 - (\text{distance } Cb_6)/(\text{distance } Cb_2 + \text{distance } Cb_6) = 0.5$$

Accordingly, the chroma Cb pixels in row 100(4) of an 4:2:2 formatted frame are interpolated from the chroma Cb pixels in the DV-25 4:2:0 formatted top field by the following formula:

$$Cb_4 = 0.5 Cb_2 + 0.5 Cb_6$$

The chroma Cb pixels for the pixel positions in row 100(5) of the 4:2:2 format can be interpolated from the pixels in rows 100(3), 100(7) by applying weights to the pixel values. The weights for pixel are:

$$WCb_T=1-(\text{distance } Cb_3)/(\text{distance } Cb_3+\text{distance } Cb_7)=0.5$$

$$WCb_B=1-(\text{distance } Cb_7)/(\text{distance } Cb_3+\text{distance } Cb_7)=0.5$$

Accordingly, the chroma Cb pixels in row 100(5) of an 4:2:2 formatted frame are interpolated from the chroma Cb pixels in the DV-25 4:2:0 formatted bottom field by the following formula:

$$Cb_5=0.5Cb_3+0.5Cb_7$$

Additionally, it is noted that when converting interlaced DV-25 4:2:0 format to 4:2:2 format, that the chroma pixels of each row are bottom pixels immediately before display, and top pixels immediately after display. For example, the chroma Cr pixels of row 100(4) are the bottom pixels for chroma Cr pixel positions in row 100(2). Immediately after the display of row 100(2), row 100(4) is displayed. After row 100(4) is displayed, the chroma Cr pixels in row 100(4) are the top pixels for the chroma Cr pixels in row 100(6).

Accordingly, the number of chroma line fetches by the feeder 715 from the frame buffer 48 are reduced by fetching the chroma Cr pixels in row 100(4) for interpolation of chroma Cr pixels in row 100(2), and storing the chroma Cr pixels in row 100(4) in the chroma line buffer 835 for display and use as top pixels for interpolating chroma Cr pixels in row 100(6).

The table below indicates the chroma line received from the line address computer 810, the selections of the multiplexers 905T, 905B, the weights provided by the line address computer 810 to the multipliers 915T, 915B, and buffer writes to chroma line buffers 835(0), and 835(1), when converting a decoded top/bottom field in the DV-25 4:2:0 format to a top/bottom (Even phase) field in the 4:2:2 format.

| | TOP/BOTTOM FIELD (Even phase) DV-25 4:2:0 => TOP/Bottom FIELD 4:2:2 | |
|---|---|---|
| Luma Line in Bitstream | Chroma Row in Bitstream | Selections of MUX Weights and Buffer Writes |
| 100(4i) | Cb in row 100(4i + 2) | 915T/Cr -> X<br>$WCr_T = 0$<br>915B/Cr -> CLB0<br>$WCr_B = 1.00$<br>915T/Cb -> CLB1<br>$WCr_T = 0.5$<br>915B/Cr -> C Bitstream<br>$WCr_B = 0.5$<br>Write Bitstream (Cb in row 100(4i + 2)) to CLB1 |
| 100(4i + 2) | Cr in row 100(4i + 4) | 915T/Cr -> CLB0<br>$WCr_T = 0.5$<br>915B/Cr -> C Bitstream<br>$WCr_B = 0.5$<br>915T/Cb -> X<br>$WCr_T = 0$<br>915B/Cr -> CLB1<br>$WCr_B = 1$<br>Write Bitstream (Cb in row 100(4i + 4)) to CLB0 |

The table below indicates the chroma line received from the line address computer 810, the selections of the multiplexers 905T, 905B, the weights provided by the line address computer 810 to the multipliers 915T, 915B, and buffer writes to chroma line buffers 835(0), and 835(1), when converting a decoded top/bottom field in the DV-25 4:2:0 format to a top/bottom (Odd phase) field in the 4:2:2 format.

| | TOP/BOTTOM (Odd phase) FIELD DV-25 4:2:0 => TOP/BOTTOM FIELD MPEG 4:2:2 | |
|---|---|---|
| 100(4i + 1) | Cb in row 100(4i + 3) | 915T/Cr -> X<br>$WCr_T = 0$<br>915B/Cr -> CLB0<br>$WCr_B = 1.00$<br>915T/Cb -> CLB1<br>$WCr_T = 0.5$<br>915B/Cr -> C Bitstream<br>$WCr_B = 0.5$<br>Write Bitstream (Cb in row 100(4i + 3)) to CLB1 |
| 100(4i + 3) | Cr in row 100(4i + 5) | 915T/Cr -> CLB0<br>$WCr_T = 0.5$<br>915B/Cr -> C Bitstream<br>$WCr_B = 0.5$<br>915T/Cb -> X<br>$WCr_T = 0$<br>915B/Cr -> CLB1<br>$WCr_B = 1$<br>Write Bitstream (Cb in row 100(4i + 5)) to CLB0 |

MPEG 4:2:0 Format to 4:2:2 Conversion

Progressive MPEG 4:2:0 to Progressive 4:2:2 and Interlaced 4:2:2

Referring now to FIG. 8A, there is illustrated a block diagram of an exemplary progressive picture 100 formatted in accordance with the MPEG 4:2:0 standard. The frame 100 comprises any number of lines 100(0), 100(0.5), 100(1), 100(2), 100(2.5), 100(3) . . . 100(N) of pixels. Each line 100(0), 100(1), 100(2) . . . 100(n) is occupied by a row of luma pixels Y. Each line 100(0.5), 100(2.5), . . . 100(n-0.5) is occupied by chroma pixels C. Every other pixel Y is adjacent to chroma pixels C by a half pixel row.

In a progressive picture with 4:2:2 format, chroma pixels C would be co-located with alternating Y pixels in horizontal direction. However, in the progressive 4:2:0 format, the chroma pixels C in row 100(0.5) are a half-pixel in the vertical direction from the chroma pixel position for the 4:2:2 format in row 100(1). Additionally, the chroma pixels C in row 100(2.5) are 1.5 pixels in the vertical direction from the pixel positions for the chroma pixel position for the 4:2:2 format in row 100(1).

The chroma pixels for the pixel positions in row 100(1) for the 4:2:2 format can be interpolated from the chroma pixels C in rows 100(0.5), 100(2.5) by applying weights to the pixel values. The weights for pixel are:

$$W_{0.5}=1-(\text{distance } C_{0.5})/(\text{distance } C_{0.5}+\text{distance } C_{2.5})=0.75$$

$$W_{2.5}=1-(\text{distance } C_{2.5})/(\text{distance } C_{0.5}+\text{distance } C_{2.5})=0.25$$

Accordingly, the chroma pixels in row 100(1) of a 4:2:2 format are interpolated from the chroma pixels in the MPEG 4:2:0 format by the following formula:

$$C_1=0.75C_{0.5}+0.25C_{2.5}$$

In the 4:2:2 format, the chroma pixels in row 100(2) are also interpolated from the chroma pixels C in row 100(0.5) and row 100(2.5). Applying the same calculations, $W_{0.5}=0.25$, and $W_{2.5}=0.75$. The chroma pixels in row 100(2) of a 4:2:2 format are interpolated from the chroma pixels in the MPEG 4:2:0 format by the following formula:

$$C_2=0.25C_{0.5}+0.75C_{2.5}$$

It is noted that each chroma pixel in the 4:2:2 format can be interpolated from a chroma pixel C in the MPEG 4:2:0 format that is above (top pixel) and a chroma pixel in the MPEG 4:2:0 format that is below (bottom pixel) the chroma pixel position in the 4:2:2 format. In odd numbered rows (or the bottom field if the display format is interlaced), 100(1), 100(3), 100(5) . . . 100(N), the weight for the top pixel, $W_T=0.75$ and the weight for the pixel below, $W_B=0.25$. In even numbered rows (or the top field if the display format is interlaced), 100(0), 100(2), 100(4) . . . 100(N−1), the weight for the top pixel, $W_T=0.25$ and the weight for the pixel below, $W_B=0.75$.

Additionally, the row containing the top pixel and the bottom pixel are the same for an even-numbered line, and an odd-numbered line immediately preceding the even-numbered line. Additionally, the bottom pixel for the even-numbered line is the top pixel for the following odd-numbered line. Accordingly, chroma line fetches by the feeder 715 can be reduced by storing the chroma line containing the chroma line containing the bottom pixels in the chroma line buffer 835 for use as the top pixels for a subsequent line.

The table below indicates the chroma line received from the line address computer 810, the selections of the multiplexers 905T, 905B, the weights provided by the line address computer 810 to the multipliers 915T, 915B, and buffer writes to chroma line buffers 835(0), and 835(1), when converting the decoded frame format from progressive MPEG 4:2:0 to progressive or interlaced 4:2:2.

| Progressive MPEG 4:2:0 to Progressive/Interlaced 4:2:2 | | |
| --- | --- | --- |
| Luma Line in Bitstream | Chroma Row in Bitstream | Selections of MUX Weights and Buffer Writes |
| 100(2i) | 100(2i + 0.5) | 915T(Cr/Cb) -> CLB0<br>$W_T$(Cr/Cb) = 0.25<br>915B/Cr -> C Bitstream<br>$W_B$(Cr/Cb) = 0.75<br>Write Bitstream (C in row 100 (2i + 0.5)) to CLB0 |
| 100(2i + 1) | 100(2i + 2.5) | 915T(Cr/Cb) -> CLB0<br>$W_T$(Cr/Cb) = 0.75<br>915B/Cr -> C Bitstream<br>$W_B$(Cr/Cb) = 0.25<br>If display format is interlaced, write bitstream (C in row 100 (2i + 2.5)) to CLB0 |

Interlaced 4:2:0 to Interlaced 4:2:2

Referring now to FIG. 8B, there is illustrated a block diagram of an exemplary interlaced picture 100 formatted in accordance with the MPEG 4:2:0 standard. The interlaced picture comprises a top field and a bottom field. The top field comprises the even-numbered lines, 100(0), 100(2), 100(4), . . . 100(N−1) and alternating lines 100(0.5), 100(4.5), . . . 100(N−2.5). The bottom field comprises the odd-numbered lines, 100(1), 100(3), 100(5), . . . 100(N) and alternating chroma lines 100(2.5), 100(6.5), . . . 100(N−0.5). Each line 100(0), 100(1), 100(2) . . . 100(n) is occupied by a row of luma pixels Y. Each line 100(0.5), 100(2.5), . . . 100(N−0.5) is occupied by chroma pixels. The chroma pixels C are horizontally aligned with alternating luma pixels Y.

Where the decoded frame format is interlaced MPEG 4:2:0 and the display format is interlaced 4:2:2, the chroma pixels in the top field of an 4:2:2 frames are interpolated from chroma pixels C in the top field of an MPEG 4:2:0.

In the top field of an interlaced picture with 4:2:2 format, chroma pixels would be co-located with alternating Y pixels in horizontal direction. However, in the top field of an interlaced picture with 4:2:0 format, the chroma pixels C in row 100(0.5) are the top pixels and are 1.5 pixels in the vertical direction above the chroma pixel position for the 4:2:2 format in row 100(2). Additionally, the chroma pixels C in row 100(4.5) are the bottom pixels and are 2.5 pixels in the vertical direction below the pixel positions for the chroma pixel position for the 4:2:2 format in row 100(2).

The chroma pixels for the pixel positions in row 100(2) for the 4:2:2 format can be interpolated from the pixels in rows 100(0.5), 100(4.5) by applying weights to the pixel values. The weights for pixel are:

$$W_T=1-(\text{distance } C_T)/(\text{distance } C_T+\text{distance } C_B)=0.625$$

$$W_B=1-(\text{distance } C_B)/(\text{distance } C_T+\text{distance } C_B)=0.375$$

Accordingly, the chroma pixels in row 100(2) of the top field from an interlaced 4:2:2 format are interpolated from the chroma pixels in the MPEG 4:2:0 format by the following formula:

$$C=0.625C_T+0.375C_B$$

The weights for row 100(4) are also interpolated from the chroma pixels C in row 100(0.5) and row 100(4.5). Applying the same calculations, $W_T=0.875$, and $W_B=0.125$.

For rows 100(4i+2), i.e., rows 100(2), 100(6), 100(10) . . . of the top field, the weight for the top pixel, $W_T=0.625$ and the weight for the pixel below, $W_B=0.375$. For rows 100(4i) of the top field, i.e., rows 100(0), 100(4), 100(8), . . . , the weight for the top pixel, $W_T=0.125$ and the weight for the bottom pixel, $W_B=0.875$.

For rows 100(4i+3) of the bottom field, i.e., rows 100(3), 100(7), 100(11), . . . , the weight for the top pixel, $W_T=0.875$ and the weight for the bottom pixel, $W_B=0.125$. For rows 100(4i+1) of the bottom field, i.e., rows 100(1), 100(5), 100(9), . . . the weight for the top pixel, $W_T=0.375$ and the weight for the bottom pixel, $W_B=0.625$.

Additionally, the rows containing the top pixels 100(4i+0.5) and the bottom pixels 100(4i+4.5) are the same for rows 100(4i+2) and 100(4i+4) in the top field. The row containing the bottom pixels 100(4i+4.5) for rows 100(4i+2) and 100(4i+4) contains the top pixels for the immediately following rows 100(4i+6) and 100(4i+8). Similarly, in the bottom field, the rows containing the top pixels 100(4i+2.5) and the bottom field 100(4i+6.5) are the same for rows 100(4i+3) and 100(4i+5) in the bottom field. Additionally, the rows containing the bottom pixels 100(4i+6.5) for rows 100(4i+3) and 100(4i+5) contain the top pixels for the immediately following rows 100(4i+7) and 100(4i+9).

Accordingly, chroma line fetches by the feeder 715 can be reduced by storing the chroma line containing the chroma line containing the bottom pixels in the chroma line buffer 835 for use as the top pixels for a subsequent line.

The table below indicates the chroma line received from the line address computer 810, the selections of the multiplexers 905T, 905B, the weights provided by the line address computer 810 to the multipliers 915T, 915B, and buffer writes to chroma line buffers 835(0), and 835(1), when converting a decoded MPEG 4:2:0 top field to an 4:2:2 top field.

| MPEG 4:2:0 Top Field to an 4:2:2 Top Field | | |
|---|---|---|
| Luma Line in Bitstream | Chroma Row in Bitstream | Selections of MUX Weights, Buffer Writes |
| 100(4i + 2) | 100(4i + 4.5) | 915T(Cr/Cb) -> CLB0<br>$W_T(Cr/Cb) = 0.625$<br>915B/Cr -> C Bitstream<br>$W_B(Cr/Cb) = 0.375$ |
| 100(4i + 4) | 100(4i + 4.5) | 915T(Cr/Cb) -> CLB0<br>$W_T(Cr/Cb) = 0.875$<br>915B/Cr -> C Bitstream<br>$W_B(Cr/Cb) = 0.125$<br>Write bitstream (C in row 100 (4i + 4.5)) to CLB0 |

The table below indicates the chroma line received from the line address computer 810, the selections of the multiplexers 905T, 905B, the weights provided by the line address computer 810 to the multipliers 915T, 915B, and buffer writes to chroma line buffers 835(0), and 835(1), when converting a decoded MPEG 4:2:0 bottom field to an 4:2:2 bottom field.

| MPEG 4:2:0 Bottom Field to an 4:2:2 Bottom Field | | |
|---|---|---|
| Luma Line in Bitstream | Chroma Row in Bitstream | Selections of MUX Weights and Buffer Writes |
| 100(4i + 3) | 100(4i + 6.5) | 915T(Cr/Cb) -> CLB0<br>$W_T(Cr/Cb) = 0.875$<br>915B/Cr -> C Bitstream<br>$W_B(Cr/Cb) = 0.125$ |
| 100(4i + 5) | 100(4i + 6.5) | 915T(Cr/Cb) -> CLB0<br>$W_T(Cr/Cb) = 0.375$<br>915B/Cr -> C Bitstream<br>$W_B(Cr/Cb) = 0.625$<br>Write bitstream (C in row 100 (4i + 4.5)) to CLB0 |

TM5 4:2:0 TO MPEG 4:2:2 Conversion

Progressive 4:2:0 to Progressive 4:2:2 and Interlaced 4:2:2

Referring now to FIG. 9A, there is illustrated a block diagram describing a decoded progressive picture with TM5 4:2:0 formatting. The picture 100 comprises any number of lines 100(0) . . . 100(N). Each line 100(0) . . . 100(N) includes a row of luma Y pixels Y0 . . . YN. Every other line 100(0), 100(2), . . . 100(N−1) includes a row of half as many chroma C pixels that are co-located with alternating luma pixels Y (indicated by an X).

In a progressive picture with 4:2:2 formatting, chroma pixels are co-located with alternating Y pixels in horizontal direction. However, in the progressive TM5 4:2:0 format, the chroma pixels in row 100(0) are one pixel above the chroma pixel position for the 4:2:2 format in row 100(1). Additionally, the chroma pixels in row 100(2) are one pixel below the pixel positions for the chroma pixel position for the 4:2:2 format in row 100(1).

The chroma pixels for the pixel positions in row 100(1) for the TM5 4:2:0 format can be interpolated from the pixels in rows 100(0) and 100(2) by applying the weights $W_T=0.5$, and $W_B=0.5$.

In the 4:2:2 format, the chroma pixels positions in row 100(2) are occupied with the TM5 4:2:0 chroma pixels in row 100(2). By convention, the pixel in row 100(2) is designated as the bottom pixel and the pixel in row 100(0) is designated as the top pixel. The weights are $W_T=0$, and $W_B=1$.

It is noted that each chroma pixel in the 4:2:2 format can be interpolated from a chroma pixel in the TM5 4:2:0 format that is above (top pixel) and a chroma pixel in the TM5 4:2:0 format that is below (bottom pixel) the chroma pixel position in the 4:2:2 format. In odd numbered rows (or the bottom field if the display format is 4:2:2 interlaced), 100(1), 100(3), 100(5) . . . 100(N), the weight for the top pixel, $W_T=0.5$ and the weight for the bottom pixel, $W_B=0.5$. In even numbered rows (or the top field if the display format is 4:2:2 interlaced), rows 100(0), 100(2), 100(4) . . . 100(N−1), the weight for the top pixel, $W_T=0$ and the weight for the pixel below, $W_B=1$.

Additionally, the row containing the top pixel and the bottom pixel are the same for an even-numbered row 100(2i), and odd-numbered line immediately preceding the even-numbered row 100(2i−1). Additionally, the bottom pixel for the even-numbered row 100(2i) is the top pixel for the following odd-numbered row 100(2i+1).

Accordingly, chroma line fetches by the feeder 715 can be reduced by storing the chroma line containing the chroma line containing the bottom pixels in the chroma line buffer 835 for use as the top pixels for a subsequent line.

The table below indicates the chroma line received from the line address computer 810, the selections of the multiplexers 905T, 905B, the weights provided by the line address computer 810 to the multipliers 915T, 915B, and buffer writes to chroma line buffers 835(0), and 835(1), when converting a decoded TM5 4:2:0 frame to an 4:2:2 format.

| Progressive TM5 4:2:0 to Progressive/Interlaced 4:2:2 | | |
|---|---|---|
| Luma Line in Bitstream | Chroma Row in Bitstream | Selections of MUX Weights and Buffer Writes |
| 100(2i + 1) | 100(2i + 2) | 915T(Cr/Cb) -> CLB0<br>$W_T(Cr/Cb) = 0.5$<br>915B/Cr -> C Bitstream<br>$W_B(Cr/Cb) = 0.5$<br>If display format is interlaced, write C bitstream (C in row 100 (2i + 2)) to CLB0 |
| 100(2i + 2) | 100(2i + 2) | 915T(Cr/Cb) -> X<br>$W_T(Cr/Cb) = 0$<br>915B/Cr -> C Bitstream<br>$W_B(Cr/Cb) = 1$<br>Write Bitstream (C in row 100 (2i + 2)) to CLB0 |

Interlaced 4:2:0 to Interlaced 4:2:2

Where the frame is an interlaced picture, the top field comprises luma pixels in the even-numbered rows 100(0), 100(2), . . . 100(N−1), and the chroma pixels on alternating rows 100(0), 100(4), . . . 100(N−3). The bottom field comprises the luma pixels in the odd-numbered rows 100(1), 100(3), . . . 100(N) and the chroma pixels in alternating rows 100(2), 100(6), . . . 100(N−1).

In row 100(2) of the top field of an interlaced picture with 4:2:2 format, chroma pixels would be co-located with alternating Y pixels in the horizontal direction. However, in a TM5 4:2:0 formatted top field, the chroma pixels in row 100(0) are the top pixels and are two pixels above the chroma pixel position for the 4:2:2 format in row 100(2). Additionally, the chroma pixels in row 100(4) are the bottom pixels and are two pixels in the vertical direction below the pixel positions for the chroma pixel position for the 4:2:2 format in row 100(2).

The chroma pixels for the pixel positions in row 100(2) for the 4:2:2 format can be interpolated from the pixels in rows 100(0) and 100(4) by applying weights to the pixel values. The weights for pixel are $W_T$=0.5 and $W_B$=0.5.

In row 100(4) of the top field of an interlaced picture with 4:2:2 format, chroma pixels are co-located with the pixels in row 100(4) in the TM5 4:2:0 format. By convention, the pixel in row 100(0) is designated as the top pixel and the pixel in row 100(4) is designated as the bottom pixel. The weights are $W_T$=0, and $W_B$=1.

In rows 100(2), 100(6), . . . 100(N-1) of the top field, the weight for the top pixel, $W_T$=0.5 and the weight for the pixel below, $W_B$=0.5. In rows 100(0), 100(4), . . . 100(N-3) of the top field, the weight for the top pixel, $W_T$=0 and the weight for the bottom pixel, $W_B$=1.

In row 100(3) of the bottom field with 4:2:2 formatting, chroma pixels would be co-located with alternating Y pixels in the horizontal direction. However, in a bottom field with TM5 4:2:0 formatting, the chroma pixels in row 100(2) are the top pixels and are one pixel above the chroma pixel position for the 4:2:2 format in row 100(3). Additionally, the chroma pixels in row 100(6) are the bottom pixels and are three pixels in the below pixel positions for the chroma pixel position for the 4:2:2 format in row 100(3).

The chroma pixels for the pixel positions in row 100(3) for the 4:2:2 format can be interpolated from the pixels in rows 100(2), 100(6) by applying weights to the pixel values. The weights for the pixel are $W_T$=0.75 and $W_B$=0.25.

In row 100(5) of the bottom field with 4:2:2 formatting, chroma pixels are co-located with alternating Y pixels in the horizontal direction. However, in the bottom field of an interlaced picture with TM5 4:2:0 format, the chroma pixels in row 100(2) are the top pixels and are three pixel above the chroma pixel position for the 4:2:2 format in row 100(5). Additionally, the chroma pixels in row 100(6) are the bottom pixels and are one pixel below the pixel positions for the chroma pixel position for the 4:2:2 format in row 100(5).

The chroma pixels for the pixel positions in row 100(5) for the 4:2:2 format can be interpolated from the pixels in rows 100(2), and 100(6) by applying weights to the pixel values. The weights for the pixel are $W_T$=0.25 and $W_B$=0.75.

In rows 100(3), 100(7), . . . of the bottom field, the weight for the top pixel is $W_T$=0.75 and the weight for the pixel below is $W_B$=0.25. In rows 100(1), 100(5), 100(9), . . . of the bottom field, the weight for the top pixel is $W_T$=0.25 and the weight for the bottom pixel is $W_B$=0.75.

In the top field, for rows 100(4$i$+2) and 100(4$i$+4), the rows containing the top pixels 100(4$i$) and bottom pixels 100(4$i$+4) are the same. Additionally, the bottom pixels 100(4$i$+4) for row 100(4$i$+4) are the top pixels for row 100(4$i$+6). Similarly, in the bottom field, for rows 100(4$i$+3) and 100(4$i$+5), the rows containing the top pixels 100(4$i$+2) and the bottom pixels 100(4$i$+6) are the same. Additionally, the bottom pixels 100(4$i$+6) for row 100(4$i$+5) are the top pixels for row 100(4$i$+7).

Accordingly, chroma line fetches by the feeder 715 can be reduced by storing the chroma line containing the chroma line containing the bottom pixels in the chroma line buffer 835 for use as the top pixels for a subsequent line.

The table below indicates the chroma line received from the line address computer 810, the selections of the multiplexers 905T, 905B, the weights provided by the line address computer 810 to the multipliers 915T, 915B, and buffer writes to chroma line buffers 835(0), and 835(1), when converting a decoded TM5 4:2:0 top field to an 4:2:2 top field.

| TM5 4:2:0 Top Field to an 4:2:2 Top Field | | |
|---|---|---|
| Luma Line in Bitstream | Chroma Row in Bitstream | Selections of MUX Weights and Buffer Writes |
| 100(4i + 2) | 100(4i + 4) | 915T(Cr/Cb) -> CLB0<br>$W_T$(Cr/Cb) = 0.5<br>915B/Cr -> C Bitstream<br>$W_B$(Cr/Cb) = 0.5 |
| 100(4i + 4) | 100(4i + 4) | 915T(Cr/Cb) -> X<br>$W_T$(Cr/Cb) = 0<br>915B/Cr -> C Bitstream<br>$W_B$(Cr/Cb) = 1<br>Write bitstream (C in row 100 (4i + 4)) to CLB0 |

The table below indicates the chroma line received from the line address computer 810, the selections of the multiplexers 905T, 905B, the weights provided by the line address computer 810 to the multipliers 915T, 915B, and buffer writes to chroma line buffers 835(0), and 835(1), when converting a decoded TM5 4:2:0 bottom field to an 4:2:2 bottom field.

| TM5 4:2:0 Bottom Field to an 4:2:2 Bottom Field | | |
|---|---|---|
| Luma Line in Bitstream | Chroma Row in Bitstream | Selections of MUX Weights and Buffer Writes |
| 100(4i + 3) | 100(4i + 6) | 915T(Cr/Cb) -> CLB0<br>$W_T$(Cr/Cb) = 0.75<br>915B/Cr -> C Bitstream<br>$W_B$(Cr/Cb) = 0.25 |
| 100(4i + 5) | 100(4i + 6) | 915T(Cr/Cb) -> CLB0<br>$W_T$(Cr/Cb) = 0.25<br>915B/Cr -> C Bitstream<br>$W_B$(Cr/Cb) = 0.75<br>Write bitstream (C in row 100 (4i + 4)) to CLB0 |

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A decoder system for displaying pictures, said method comprising:
   a video decoder for decoding a picture, the decoded picture having a decode format;
   a chroma filter for interpolating chroma pixels for a display format;
   a line address computer for providing a set of weights to the chroma filter, the set of weights comprises a first set if the decode format comprises a first format, and a second set of weights to the display engine, if the decode format comprises a second format;
   a first chroma line buffer for storing a row of displayed chroma Cr pixels;
   a second chroma line buffer for storing a row of chroma Cb pixels; and
   wherein the chroma line buffer:
      receives an input for receiving another row of chroma Cr pixels;
      interpolates a row of chroma Cr pixels for the display format based on the stored row of chroma Cr pixels, the received row of chroma Cr pixels, and the provided set of weights, thereby resulting in an interpolated row of chroma Cb pixels; and
      provides the row of chroma Cb pixels stored in the second chroma line buffer with the interpolated row of chroma Cb pixels for display; and
   wherein the chroma filter interpolates the chroma pixels for the display format based on the provided set of weights.

2. The decoder system of claim 1, wherein the line address computer provides a third set of weights to the chroma filter, wherein the decode format comprises a third format.

3. The decoder system of claim 1, wherein the first format, and the second format are selected from a group consisting of DV-25, TMS, and MPEG 4:2:0, and wherein the display format is 4:2:2.

4. The decoder system of claim 1, wherein the decoder system further comprises:
   a chroma line buffer for storing a row of top chroma pixels; and
   wherein the chroma filter further comprises:
      a first multiplier for multiplying the row of top chroma pixels with a first one of the set of weights;
      a second multiplier for multiplying a bitstream comprising a row of bottom pixels with a second one of the set of weights; and
      an adder for adding the product from the first multiplier and the product from the second multiplier.

5. The decoder system of claim 4, wherein:
   the chroma line buffer stores the bottom pixels from the bitstream;
   the first multiplier multiplies the bottom pixels stored in the chroma line buffer with the first one of the set of weights;
   the second multiplier multiplies another row of chroma pixels from the bitstream with the second one of the weights;
   the adder adds the products of the first multiplier and the second multiplier, thereby generating another row of chroma pixels for the display format.

6. The decoder system of claim 1, wherein the second chroma line buffer overwrites the chroma Cb pixels with the received another row of chroma Cb pixels.

7. The decoder system of claim 6, wherein the chroma filter:
   receives a row of Cb pixels; and
   interpolates another row of Cb from the row of chroma Cb pixels stored in the local memory and the another row of chroma Cb pixels received.

8. A circuit for interpolating chroma pixels, said circuit comprising:
   an input configured to receive an input bitstream;
   a first chroma line buffer connected to the input, and configured to store at least a portion of the input bitstream;
   a second chroma line buffer connected to the input and configured to store at least a portion of the input bitstream;
   a first multiplexer with inputs, a first of the inputs connected to the first chroma line buffer, a second of the inputs connected to the second chroma line buffer, and a third of the inputs connected to the input configured to receive an input bitstream, the first multiplexer configured to select a particular one of the inputs as an output; and
   a second multiplexer with inputs, a first of the inputs connected to the first chroma line buffer, a second of the inputs connected to the second chroma line buffer, and a third of the inputs connected to the input configured to receive an input bitstream, the second multiplexer configured to select a particular one of the inputs as an output.

9. The circuit of claim 8, further comprising:
   a first multiplier connected to the output of the first multiplexer, the first multiplier receiving a first weight from a line address computer and providing a product of the first weight and the output of the first multiplexer; and
   a second multiplier connected to the output of the second multiplexer, the second multiplier receiving a second weight from the line address computer and providing a product of the first weight and the output of the first multiplexer.

10. The circuit of claim 9, further comprising:
   an adder connected to the first multiplier and the second multiplier, the adder configured to add the product of the first multiplier to the product of the second multiplier.

* * * * *